Figure 1:
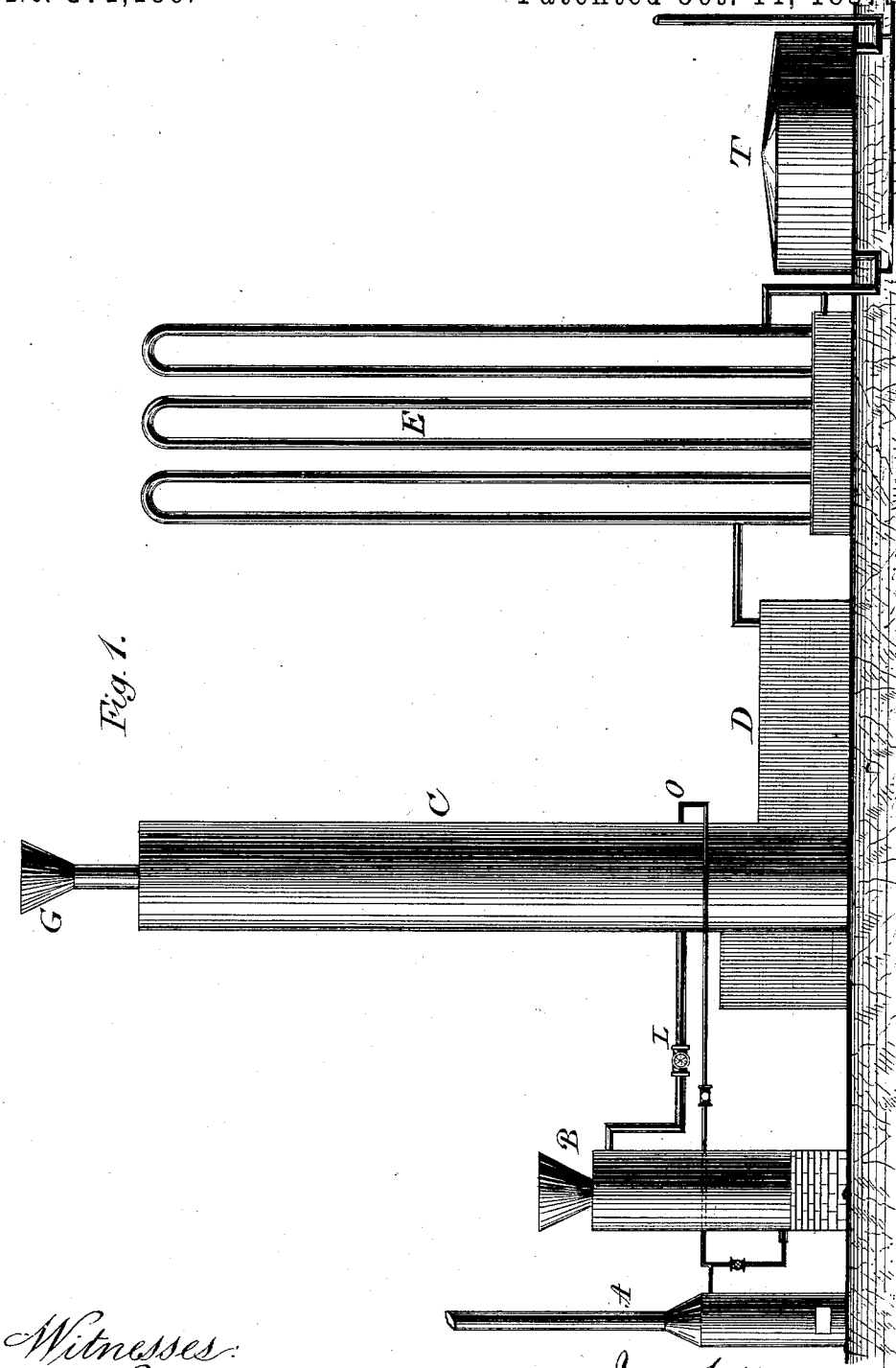

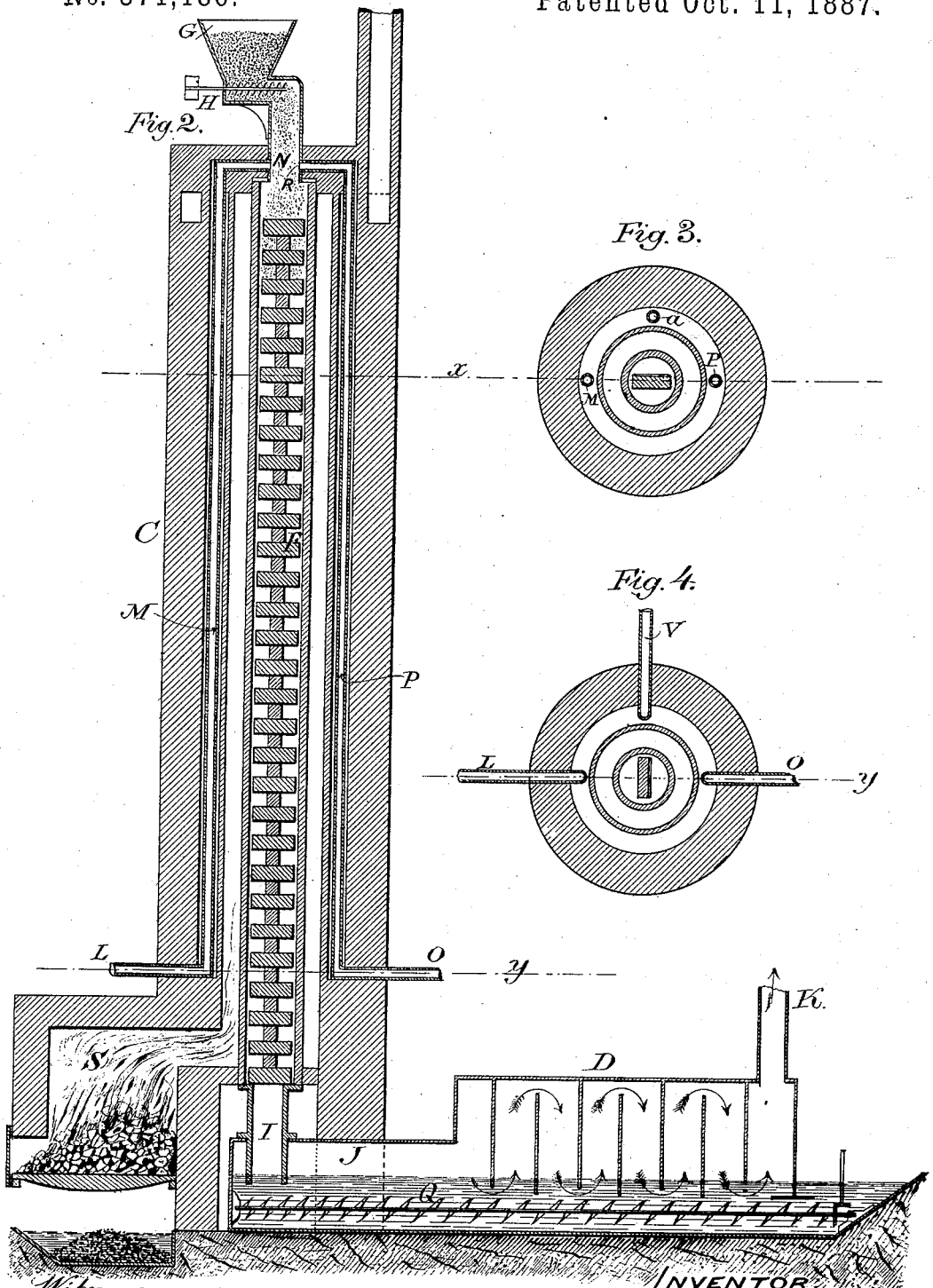

UNITED STATES PATENT OFFICE.

THOMAS B. FOGARTY, OF BROOKLYN, ASSIGNOR TO JOHN A. BALESTIER, TRUSTEE, OF NEW YORK, N. Y.

PROCESS OF AND APPARATUS FOR MAKING AMMONIUM SULPHATE.

SPECIFICATION forming part of Letters Patent No. 371,186, dated October 11, 1887.

Application filed October 16, 1886. Serial No. 216,465. (No model.)

*To all whom it may concern:*

Be it known that I, THOMAS B. FOGARTY, of the city of Brooklyn, county of Kings, and State of New York, have invented a new and useful Process of and Apparatus for Producing Sulphate of Ammonia; and I hereby declare the following to be a full, clear, and exact specification of the same, reference being had to the accompanying drawings, forming a part of this specification.

The object of my invention is to cheapen the production of sulphate of ammonia by producing, first, carbonate of ammonia, or its equivalent components, through the combustion of alkalized carbon in an atmosphere composed of incandescent air, steam, and nitrogenous gas, and, second, separating from the combustible gases produced the resulting carbonate of ammonia or its components, and fixing them by means of gypsum with the production of sulphate of ammonia and carbonate of lime.

It is well understood that ammonia cannot be practically produced upon a large scale by the direct synthesis of its elements; but it is at the same time well known that there is no practical obstacle in the way of the artificial production of cyanogen, and that this having been produced as an intermediate step, its conversion into ammonia is an easy matter. It is well known, also, that it is extremely difficult to effect the combination of nitrogen and carbon—the elements of cyanogen—and to form free cyanogen gas, even at a high temperature. If, however, an alkali or alkaline earth, or, indeed, any substance capable of combining with cyanogen or of producing a substance capable of combining with it, be present, cyanogen is readily produced from its elements and combines with the alkali to form a cyanide or cyanate, which in turn may be decomposed by steam with the production of ammonia, oxides of carbon, and hydrogen gas. Taking advantage of this disposition of incandescent nitrogen and carbon to combine in the presence of an alkali, I submit a suitably-prepared mixture of carbon and alkali to the action of nitrogenous gas in a close furnace or retort, and simultaneously with such gas, or mixed therewith, I also introduce into my retort suitably-adjusted volumes of steam and air, preferably superheated, whereby not only the cyanides resulting from the combination of the nascent cyanogen may as fast as formed be decomposed by the steam with the production of ammonia, oxides of carbon, and hydrogen gas, and the return of the alkali to its original state or its entrance into fresh combinations, but, also, the air present will tend to promote the combustion and to maintain the temperature of the retort at a higher and more uniform point, while the volume of fuel-gas will at the same time be largely increased. The nitrogen used may be derived from any suitable source; but I prefer to obtain it from the nitrogenous gas produced by the partial combustion of coal, coke, or any other suitable form of carbon in a closed furnace or cupola.

I shall now proceed to describe my invention so fully and clearly that any person skilled in the art of making sulphate of ammonia may be able to understand and practice the same, and for this purpose I shall divide or classify it into three heads or parts, consisting, first, in obtaining nitrogen, either pure or as contained in nitrogenous fuel-gas mixed with other gases; second, in causing the nitrogen of such nitrogenous gas to combine with hydrogen and to produce ammonia, oxides of carbon, and hydrogen gas, and, third, in separating the ammonia and carbonic acid from the other gases by means of gypsum, with the production of sulphate of ammonia and carbonate of lime.

In carrying out the first part of my invention I prefer to make a nitrogenous fuel-gas by forcing air, either alone or mixed with steam, through a suitable cupola, furnace, or retort suitably filled or charged with coal or coke, or other suitable carbonaceous fuel, in a state of combustion or incandescence.

My second step consists in the conversion, either in whole or in part, of the nitrogen of the nitrogenous gas into ammonia; and it consists in causing the gas to pass through a suitably-constructed cupola, furnace, or retort, wherein it meets with suitably-adjusted currents or moving volumes of suitably-mixed carbon and alkali, preferably in a pulverized or finely-divided state, and steam and air preferably superheated, and wherein the mixed volume of nitrogenous gas, alkalized carbon, steam, and air is subjected to a high or incandescent temperature, under the influence of which the alkalized carbon combines with the nitrogen of the gas to form alkaline cyanides, which are in turn decomposed by the steam with the production of ammonia, oxides of carbon, and hydrogen gas, while the combined alkali returns to its original state or enters into fresh combinations. The combustion is largely promoted by the air present, and consequently the retort is maintained at a higher and more uniform temperature, while the volume of nitrogenous gas is largely increased.

The annexed drawings illustrate and are a part of this specification.

In Figure 1, which shows in elevation the general arrangement and form of my apparatus, A is a steam-boiler of any suitable construction; B, a cupola or furnace for producing nitrogenous gas; C, a furnace for the conversion of the nitrogen of the nitrogenous gas into ammonia; D, a washer, wherein the solid matter escaping from C is separated from the gas; E, a condenser, wherein the gas, now largely impregnated with ammonia, is cooled preparatory to the conversion of the ammonia present into a sulphate, such conversion being effected in a purifying box, T, or set thereof, of the ordinary construction.

In Fig. 2, which is a vertical section of C and D, Fig. 1, F is a vertical cupola or retort, provided at top with a hopper, G, having a suitable feeding screw, H, for feeding the alkalized carbon into the retort F, which contains shelves or bafflers whereby the downward passage of the alkalized carbon through the retort is retarded. I is the outlet from the retort F, and is suitably sealed in the liquid contained in the hydraulic main J. D is a washer, in which the gas is freed from such dust as may adhere to it, and whence it escapes through the outlet K into the condenser E, where it is cooled, and whence it passes to the purifier T, in which the contained ammonia is separated and converted into sulphate of ammonia by being caused to combine with the sulphuric acid of gypsum—sulphate of lime. L is the inlet for the admission of nitrogenous gas to a superheater, M, whence it passes into the retort F at N. O is an inlet for the admission of steam to a superheater, P, whence it passes into the retort F, at R. S is a furnace of any suitable construction for heating the cupola or retort F and superheaters M and P.

Figs. 3 and 4 are sections of Fig. 2 on the lines $x$ and $y$, respectively, in which L, V, and O show the inlets to the gas-superheater M, the steam superheater P, and the air-superheater $a$, (particularly shown in Fig. 3,) respectively.

The mode of operation is as follows: I first force air alone, or air and steam mixed, through a suitably-constructed cupola or furnace, B, containing incandescent coal, coke, or charcoal, or any other suitable form of carbonaceous fuel in a state of combustion or incandescence, and thereby produce a fuel-gas containing a large percentage of nitrogen. I next cause my nitrogenous gas to pass through a pipe, L, into a superheater, M, wherein it is raised to a high or incandescent temperature. From the superheater M my gas passes into a retort, F, which is maintained at a high or incandescent temperature by the furnace S, and wherein it meets volumes of steam and air, preferably superheated by means of the superheaters P and $a$. The mixed volume of gas, steam, and air now encounters a suitably-adjusted volume of carbon and alkali, which has been previously pulverized and which is fed continuously into the retort F by means of the screw H from the hopper G, whereupon the mixed volumes of gas, steam, air, and pulverized material pass downward through the retort, wherein it is raised to and maintained at a high or incandescent temperature, the consequence of which is that the nitrogen of the gas unites with the carbon and alkali to form with them cyanides and cyanates, and these in turn are decomposed by the steam present, producing ammonia, oxides of carbon, and hydrogen gas, while the alkali is set free and returns to its original state or enters into fresh combinations, the air present serving to promote the combustion and thereby to maintain the temperature of the retort, and at the same time to add largely to the volume of nitrogenous gas. I adjust the volume of steam used so that it may be largely in excess of that required for the mere decomposition of the cyanides and the resulting production of ammonia, because I am thus enabled, through the decomposition of the steam by the pulverized carbon, to increase both the volume and quality of my resulting gases, and with the additional advantage of furnishing to any desired extent, either in the form of gas or of undecomposed steam, a gaseous envelope sufficient for the protection and preservation of the ammonia produced, which might otherwise be destroyed by contact with the heated surfaces of the interior of the retort, at the same time that a suitably-adjusted volume of air serves to maintain combustion sufficient to counteract the cooling effect of this large volume of steam. My gaseous products and undecomposed carbon now escape from the retort through the outlet I, and pass into a suitable hydraulic main, J, wherein they become partially separated, the heavier portion of the carbon remaining in J while the gaseous mixture passes onward through the washer D, wherein the floating particles of dust which still adhere to it are washed out, and whence it escapes to the condenser or other cooling apparatus, E, Fig. 1, wherein it is cooled and whence it passes to a purifying-box, T, which is suitably provided with suitable trays or shelves covered with a layer of pulverized gypsum mixed with breeze or sawdust or some other material capable of rendering the mass permeable to the escaping gases, the ammonia and carbonic acid of which combine with and decompose the gypsum, with the production of sulphate of ammonia and carbonate of lime. The sulphate of ammonia, being soluble, may now be separated from the lime by leaching, after which it is ready to be crystallized and prepared for market in the usual manner. The solid matters which remain in the hydraulic main and washer may be removed by the screw Q.

It is evident that the superheaters M, $a$, and P may be dispensed with; but it is equally manifest that this cannot be done advantageously, for while the gaseous and pulverulent volume would, under any circumstances, be soon raised to a high temperature by the heat of the retort, the effect of this would be to throw so much more work upon the retort itself, with the result of diminishing its effectiveness to a corresponding extent, and consequently it is most desirable that the gas, steam, and air should all be raised to as high a temperature as practicable before entering the retort. It is also evident that the gas, steam, and air, or any two of them, may, without serious disadvantage, be mixed before being superheated.

I do not bind or confine myself to the exact processes or succession of processes or to the precise form of apparatus described, for it is evident that they may be varied indefinitely.

I am aware that in my previous patents for the manufacture of gas and for producing ammonia, No. 254,204, dated February 28, 1882, No. 261,698, dated July 25, 1882, Nos. 265,792 and 265,793, each dated October 10, 1882, and Nos. 288,323 and 288,324, each dated November 13, 1883, I have described processes and apparatus for manufacturing gas and producing ammonia, and disclaim in this application any inventions described in such patents.

I am also aware of my application No. 216,466, filed October 16, 1886, and disclaim in this application, which is for an improvement upon the same, any invention described in said application first named.

What I claim, and desire to secure by Letters Patent, is—

1. The process herein described of producing sulphate of ammonia, consisting, substantially, as follows: first, injecting air alone, or air and steam mixed, into and through incandescent carbonaceous fuel contained in a suitable furnace, causing the oxygen of the air or of the combined volume of air and steam to combine with the carbon of the fuel and to produce oxides of carbon, free hydrogen, and nitrogen gas; second, causing the crude nitrogenous gas so produced to mix with suitably-adjusted volumes of steam and air, and the mixed volume of gas, steam, and air to meet with a moving or falling volume of pulverized carbon and alkali and the nitrogen of the gaseous mixture to combine with such carbon and alkali, producing cyanogen and alkaline cyanides, which in turn are decomposed by the steam present, producing ammonia, hydrogen gas, and oxides of carbon; third, combining the ammonia and carbonic acid in the gases resulting from the second sub-process with the sulphuric acid and lime of gypsum, and producing sulphate of ammonia and carbonate of lime, substantially as described.

2. In a process for producing sulphate of ammonia, the process of causing nitrogenous generator gas to meet and mix with suitably-adjusted volumes of steam and air, and the mixed volume of gas, steam, and air so formed to meet with a moving or falling volume of pulverized or finely-divided carbon and alkali, and raising the entire volume, both gaseous and solid, to a high or incandescent temperature, causing the nitrogen of the gaseous mixture to combine with the carbon and alkali and to produce cyanogen, which in turn is decomposed by the steam present, producing ammonia, hydrogen gas, and oxides of carbon; next, combining the ammonia and carbonic acid in the gaseous volume with the sulphuric acid and lime of gypsum and producing sulphate of ammonia and carbonate of lime, substantially as described.

3. In producing sulphate of ammonia in the manner substantially as described, the sub-process of producing ammonia, hydrogen gas, and oxides of carbon, which consists in causing the nitrogenous gas in a highly-heated state to meet in the same retort and at about the same point thereof, with volumes of superheated steam and air, and the gases so formed to accompany volumes of pulverized carbon and alkali, at about the same high temperature, falling through said retort and thereby produce cyanogen, which in time is decomposed by the steam present in the combined gases, substantially as described.

4. In an apparatus for producing sulphate of ammonia, the combination of the retort F, having inclosing superheating-chambers, air, gas, and steam pipes arranged in close proximity to the same throughout their whole extent, a hydraulic main connected with said retort and provided with an extracting-screw, a condenser, E, connected with said hydraulic main, and a purifier and separator, T, connected with said condenser, all constructed and arranged substantially as described.

In testimony whereof I have signed my name to this specification before two subscribing witnesses.

THOS. B. FOGARTY.

Witnesses:
EDWIN F. COREY,
ALBERT B. VAN WINKLE.